(12) United States Patent
Mellot

(10) Patent No.: US 9,200,951 B2
(45) Date of Patent: Dec. 1, 2015

(54) CIRCUIT AND METHOD FOR MEASURING AN AMBIENT LIGHT LEVEL

(71) Applicant: STMicroelectronics (Grenoble 2) SAS, Grenoble (FR)

(72) Inventor: Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 164 days.

(21) Appl. No.: 14/107,844

(22) Filed: Dec. 16, 2013

(65) Prior Publication Data

US 2014/0166859 A1 Jun. 19, 2014

(30) Foreign Application Priority Data

Dec. 18, 2012 (FR) ...................................... 12 62198

(51) Int. Cl.
*H04N 5/222* (2006.01)
*G01J 1/42* (2006.01)
*H04N 5/232* (2006.01)
*H04N 5/235* (2006.01)
*H04N 5/345* (2011.01)

(52) U.S. Cl.
CPC ............ *G01J 1/4204* (2013.01); *H04N 5/2351* (2013.01); *H04N 5/23245* (2013.01); *H04N 5/345* (2013.01)

(58) Field of Classification Search
CPC .... H04N 5/235; H04N 5/23245; H04N 5/345
See application file for complete search history.

(56) References Cited

U.S. PATENT DOCUMENTS

| | | | |
|---|---|---|---|
| 6,469,289 B1 * | 10/2002 | Scott-Thomas et al. ... | 250/208.1 |
| 8,154,534 B2 * | 4/2012 | Steer ............................. | 345/175 |
| 2006/0268416 A1 | 11/2006 | Nixon et al. | |
| 2009/0084943 A1 | 4/2009 | Solhusvik et al. | |
| 2010/0141571 A1 | 6/2010 | Chiang et al. | |
| 2010/0308345 A1 | 12/2010 | Brown et al. | |
| 2012/0092541 A1 | 4/2012 | Tuulos et al. | |

OTHER PUBLICATIONS

INPI Search Report and Written Opinion for FR 1262198 mailed Apr. 26, 2013 (9 pages).

* cited by examiner

*Primary Examiner* — Tony Ko
(74) *Attorney, Agent, or Firm* — Gardere Wynne Sewell LLP

(57) ABSTRACT

A device includes an image sensor and a circuit for controlling the sensor. The control circuit is configured control the device in a first operating mode and second operating mode. In the first operating mode images acquired by the sensor are output. In the second operating mode, no images are provided, but a selected subassembly of pixels of the image sensor are read and image data therefrom is processed to provide an ambient luminosity value.

5 Claims, 1 Drawing Sheet

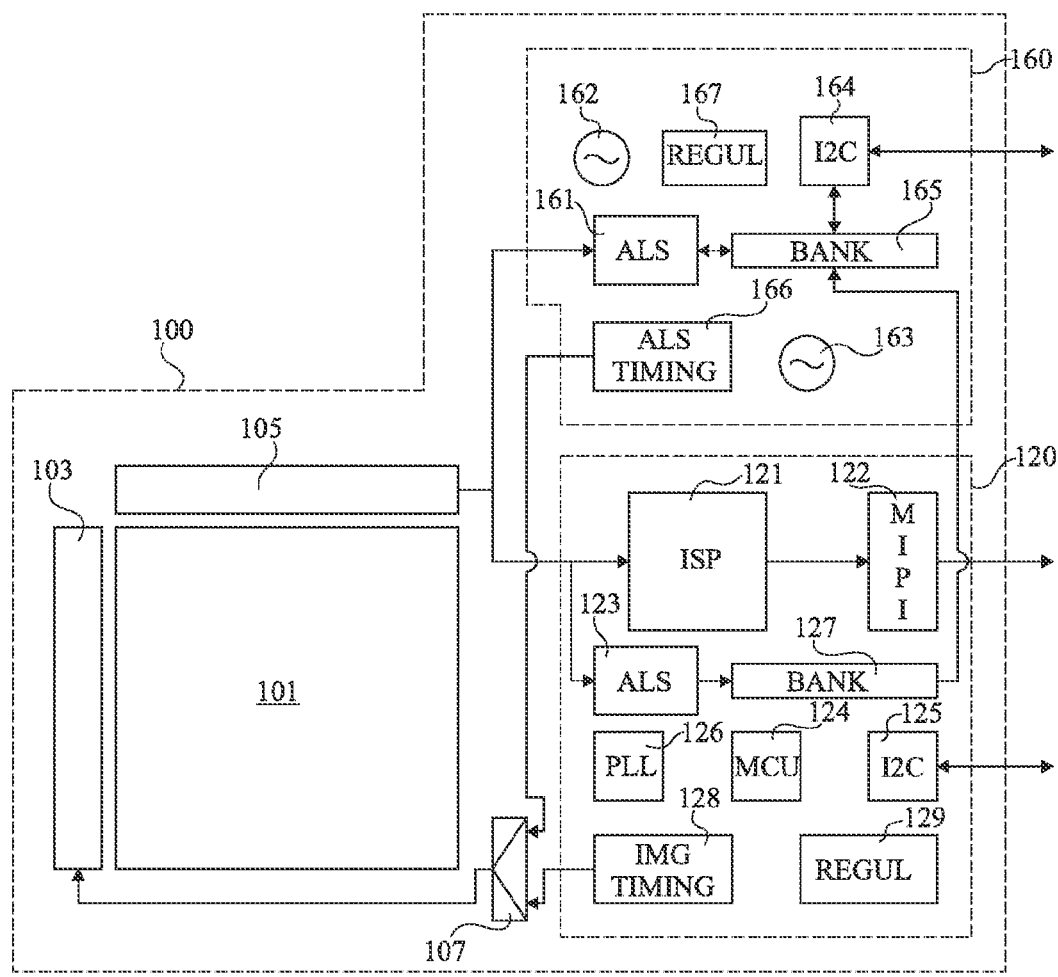

CIRCUIT AND METHOD FOR MEASURING AN AMBIENT LIGHT LEVEL

PRIORITY CLAIM

This application claims priority from French Application for Patent No. 1262198 filed Dec. 18, 2012, the disclosure of which is incorporated by reference.

TECHNICAL FIELD

The present disclosure generally relates to electronic methods and circuits, and more specifically aims at methods and circuits for measuring an ambient light level.

BACKGROUND

In certain devices comprising an illuminated display, a circuit is provided for measuring the ambient luminosity or ambient light level, and to automatically adjust the light intensity of the display according to the measured lighting level. This especially enables to improve the user-friendliness of the display and/or to save power.

Circuits for measuring the ambient luminosity level are known, which comprise a photodiode used in reverse mode, having its junction capacitance discharged by a photocurrent according to a received light intensity.

A disadvantage is that the provision of a photodiode specifically dedicated to measuring the ambient luminosity level increases the cost, the complexity, and the bulk of the device.

SUMMARY

An embodiment aims at overcoming all or part of the disadvantages of existing ambient luminosity measurement circuits and methods.

Thus, an embodiment provides a device comprising an image sensor, and a circuit for controlling the sensor configured for, in a first operating mode, providing images acquired by the sensor and, in a second operating mode where the sensor provides no image: selecting a subassembly of pixels of the sensor; for each pixel in the subassembly, reading an output value of the pixel independent from the output values of the other pixels; and providing an ambient luminosity value based on the output values of the sole pixels of the subassembly.

According to an embodiment, the control circuit is further configured for, in the first operating mode, providing an ambient luminosity value based on the output values of all or part of the pixels of the sensor.

According to an embodiment, the control circuit comprises a first control sub-circuit capable of providing images acquired by the sensor.

According to an embodiment, the control circuit comprises a second control sub-circuit capable of selecting a subassembly of pixels of the sensor; for each pixel in the subassembly, reading an output value of the pixel independent from the output values of the other pixels; and providing an ambient luminosity value based on the output values of the sole pixels of the subassembly.

According to an embodiment, the first control sub-circuit is deactivated in the second operating mode.

According to an embodiment, in the second operating mode, the second control sub-circuit periodically provides an ambient luminosity measurement.

According to an embodiment, in the second operating mode, between two successive luminosity measurements, the second control sub-circuit is totally or partially deactivated during a stand-by period.

According to an embodiment, the sensor comprises pixels screened by an opaque mask, and the pixel subassembly selected in the second operating mode comprises screened pixels.

Another embodiment provides a method for controlling a device comprising an image sensor, comprising, in a first operating mode, providing images acquired by the sensor and, in a second operating mode where the sensor provides no images: selecting a subassembly of pixels of the sensor; for each pixel in the subassembly, reading an output value of the pixel independent from the output values of the other pixels; and providing an ambient luminosity value based on the output values of the sole pixels of the subassembly.

According to an embodiment, the method comprises, in the first operating mode, providing an ambient luminosity value based on the output values of all or part of the pixels of the sensor.

The foregoing and other features and advantages will be discussed in detail in the following non-limiting description of specific embodiments in connection with the accompanying drawing.

BRIEF DESCRIPTION OF THE DRAWINGS

FIG. 1 schematically shows, in the form of blocks, an embodiment of a device comprising an image sensor and a circuit for controlling this sensor.

DETAILED DESCRIPTION OF THE DRAWINGS

To avoid providing a photodiode specifically dedicated to measuring the ambient luminosity, United States Patent Application Publication No. 2010/0141571 (the '571 reference) teaches, in a device comprising a display screen and a CMOS image sensor, using the photodiodes of the image sensor to measure an ambient luminosity level. An issue which then arises is, during operating phases of the device where the sensor is not used to provide images, to provide an ambient luminosity level while limiting as much as possible the electric power consumption of the sensor. To achieve this, the '571 reference provides, during operating phases where the sensor provides images, using an output parameter of a loop of automatic control of the sensor exposure to estimate the average luminosity level received by the sensor, and, during operating phases during which the sensor provides no images, connecting all the sensor photodiodes to a same output node of the sensor and measuring the voltage at this output node at the end of an integration period before and after which the sensor photodiodes are reset.

A disadvantage is that significant differences in the response to light of the luminosity measurement device can be observed between operating phases during which the sensor provides images and operating phases during which the sensor provides no image. This makes the exploitation of luminosity measurements difficult.

A CMOS image sensor pixel comprises a plurality of pixels, each pixel essentially comprising a photodiode used in reverse mode, having its junction capacitance discharged by a photocurrent according to a received light intensity. The measurement of the lighting level received by a pixel is performed by measuring the quantity of charges contained in the photodiode at the end of an integration period before and after which the pixel is reset by recharging of its photodiode. To perform this measurement, each pixel may comprise a transfer transistor between its photodiode and a pixel read node, and a reset transistor between the read node and a node or rail of application of a reset voltage, for example, a high power supply node or rail of the sensor. In an image acquisition phase, the photodiodes of the sensor are first reset by successively or simultaneously turning on the reset and transfer transistors of each pixel and then, in each pixel, the transfer transistor is maintained in the off (non-conductive) state during a pixel integration period, during which the voltage across the photodiode decreases at a speed depending on the light intensity received by the pixel. At the end of the integration period, it may be provided, in each pixel, for a relatively short time interval, to: reset the pixel read node by turning on and then back off the pixel reset transistor; transferring the charges stored in the photodiode onto the read node by turning on and then back off the pixel transfer transistor; and reading the voltage of the read node, which is an output value of the pixel.

In the '571 reference, during phases where the sensor provides images, the luminosity measurement is performed based on the values of the pixels of the images acquired by the sensor (via a loop of automatic control of the sensor exposure). In phases during which the sensor provides no images, the transfer and reset transistors of all the sensor pixels are permanently maintained in the on (conductive) state, to connect all the sensor photodiodes to a same node for delivering an ambient luminosity signal or output node. A control switch connects this output node to a sensor power supply node. To perform a luminosity measurement, it is provided to turn on the control switch to reset (recharge) all sensor photodiodes, and then to turn off the control switch for a sensor integration period, during which the voltage at the output node decreases at a speed depending on the total light intensity received by the sensor. At the end of the integration period, it is provided to read the voltage at the output node, which is a measurement of the ambient luminosity level.

The sensor pixels are thus not controlled in the same way during operating phases when the sensor provides images and during operating phases when the sensor provides no images. This causes differences in the response to light of the ambient luminosity measurement device between the two operating phases. More specifically, a problem has to do with the fact that dark currents affect the ambient luminosity measurement by different proportions in the two operating phases.

A dark current is the residual electric current in a pixel in the absence of lighting. At the end of a pixel integration period, the quantity of charges contained in the photodiode is substantially equal to the addition of the charges generated in the photodiode under the effect of the incident light radiation during the integration period, and of the charges generated in the photodiode under the effect of the dark current during the integration period. However, the dark current affects not only the pixel photodiode, but also its reading area (which may be a charge storage diode having its cathode connected to the read node). Thus, during the integration, stray charges generated under the effect of the dark current are stored not only in the pixel photodiode, but also in its reading area.

In the '571 reference, in operating phases when the sensor provides images, only the stray charges generated in the photodiode affect the final pixel output value. Indeed, in an image acquisition phase, the read node is generally reset just before the charge transfer from the photodiode to the read node, which causes the draining off of the stray charges stored in the photodiode during the integration. Such charges thus do not affect the ambient luminosity level. However, in operating phases during which the sensor provides no images, the transfer transistors of the pixels are in the on state during the integration. The ambient luminosity level is thus affected by the stray charges generated in the reading area during the integration. This especially results in that low ambient luminosity levels are more poorly discriminated in operating phases where the sensor provides no images than in operating phases where the sensor provides images.

According to an aspect, it is here provided, in a device comprising an image sensor, for example, a CMOS sensor, to use photodiodes of the image sensor to measure an ambient luminosity level. To achieve this, it is provided, in a first embodiment where the sensor provides images, to provide an ambient luminosity measurement or value based on the values of all or part of the pixels of the images acquired by the sensor and, in a second operating mode where the sensor provides no images, to: select a subassembly of pixels of the sensor; for each pixel in the subassembly, read an output value of the pixel independent from the output values of the other pixels; and provide an ambient luminosity value based on the output values of the sole pixels of the subassembly. More specifically, in the second operating mode, it is provided, to obtain a luminosity measurement by using photodiodes of the sensor, to apply to the selected pixels sequences of control signals similar or identical to the control sequences applied in image acquisition phases in the first operating mode. It is especially provided, in the second operating mode, to integrate the photodiodes of the selected pixels independently from one another, that is, without connecting them together. Further, in both operating modes, it is preferably provided to maintain the transfer transistors of the selected pixels in the off state during the integration and, at the end of the integration, to reset the read node of each pixel before transferring thereto the charges stored in the photodiode. As an example, it is provided, in the second operating mode, to apply to the selected pixels control sequences where only the photodiode integration time may change with respect to the control sequences applied during image acquisition phases in the first operating mode.

An advantage is that the luminosity measurement in the second operating mode is coherent with the luminosity measurement in the first operating mode, that is, for identical integration periods and identical sensor lighting levels, the provided luminosity value is substantially the same in the two operating modes. In particular, for identical integration periods and lighting levels, dark currents affect the luminosity measurement by identical proportions in the two operating modes.

In both operating modes, the provided ambient luminosity value may be based on the average of the output values of the read pixels. Other formulas for calculating the luminosity level taking into account, in the first operating mode, the values of all or part of the pixels of the images acquired by the sensor and, in the second operation mode, the values of the selected pixels, may however be used.

In both operating modes, it is preferably provided, during the luminosity level calculation, to assign to the pixel values on which the measurement is based, a multiplication coefficient or gain depending on the integration period, to make the luminosity measurement independent from the pixel integration time.

In the second operating mode, the integration time of the selected pixels may be automatically adjusted according to the ambient luminosity level. As an example, if, during a luminosity measurement, the measured luminosity level is smaller than a low threshold, or greater than a high threshold, it may be provided, at the next measurement, respectively to increase or to decrease the integration time, to always try to be in a range of linear operation of the pixel. In the first operating mode, the luminosity measurement device however cannot control the integration time, which is set by the image acquisition device.

In the second operating mode, the selected pixel subassembly for example comprises a plurality of pixel lines evenly distributed across the sensor. The selected subassembly for example comprises one pixel lines out of 16 or one pixel line out of 32. Other selected lines to non-selected lines proportions and other distributions of the selected lines may of course be provided.

In a preferred embodiment, in both operating modes, only the values of green pixels of the sensor (in the case of a color image sensor) are used to calculate the ambient luminosity level. The values of the green pixels indeed better reflect the average ambient luminosity level sensed by a human being than the values of the other pixels.

It should be noted that certain image sensors comprise pixel lines screened by an opaque mask, for example, a metal track, which do not directly take part in the image acquisition but which enable to decrease, in the final image, the noise due to dark currents. In such sensors, during an image acquisition phase, it is generally provided to read not only the values of the "useful" pixels of the sensor, that is, the non-screened pixels, but also the values of the screened pixels, which reflect the dark noise. Screened pixels values can then be subtracted from the useful pixel values, which improves the quality of the final image.

In the case where the image sensor comprises screened pixels, it may be provided to take into account the output values of the screened pixels in the ambient luminosity level measurement. More specifically, in the two operating modes, it may be provided to base the calculation of the luminosity level on values of non-screened pixels of the sensor, to which values of screened pixels have previously been subtracted. To achieve this, in the second operating mode, it is provided to include screened pixels in the subassembly of selected pixels.

In the second embodiment, circuits for providing images acquired by the sensor, and/or circuits for processing these images, as well as certain sensor control circuits, may be deactivated to decrease the electric power consumption of the device.

Further, to still decrease the electric power consumption due to the ambient luminosity measurement, it is preferably provided, in the second operating mode, to periodically perform luminosity measurements at a relatively low frequency while providing, between two successive measurements, a standby period during which the sensor and its control circuits may be deactivated. The stand-by period, for example, on the order of 100 ms, is preferably preponderating over the measurement time, for example, on the order of from 0.5 to 10 ms. In the first operating mode, luminosity measurements may be performed at the frequency of image acquisition by the sensor, or at a lower frequency.

An advantage of the provided embodiment is that, in the first operating mode, the luminosity measurement causes no increase of the electric power consumption of the sensor and, in the second embodiment, the luminosity measurement only causes a low electric power consumption by the sensor and its control circuits, typically of the same order of magnitude as the power consumption of a detector specifically dedicated to the ambient luminosity measurement.

The provided luminosity measurement mode may be used in any device comprising an image sensor, for example, a telephone, a tablet, a computer, a digital camera, etc.

FIG. 1 schematically shows, in the form of blocks, an embodiment of a device 100 capable, in a first operating mode, of providing images and an ambient luminosity level and, in a second operating mode, of providing an ambient luminosity measurement without providing an image. Device 100 comprises an image sensor 101 and a circuit for controlling this sensor, for example, formed on a same integrated circuit chip. In this example, the sensor control circuit comprises a line selection circuit 103, a line reading circuit 105, and two control sub-circuits 120 and 160. Control sub-circuit 120 is designed for, in the first operating mode, providing images and an ambient luminosity measurement. Control sub-circuit 160 is designed for, in the second operating mode, providing a luminosity measurement without providing any image.

Control sub-circuit 120 comprises a signal processing unit 121 (ISP) receiving image data provided by read circuit 105 in digital form and adapted, if need be, to applying processings to the image data. Circuit 120 further comprises a fast image output interface 122 (MIPI) receiving the image data after their possible processing by unit 121, and capable of transmitting these data to external circuits, for example, storage, display, communication circuits, etc. Circuit 120 further comprises a unit 123 for calculating the ambient luminosity level (ALS) receiving the image data provided by read circuit 105 in digital form, and capable of providing a luminosity measurement based on all or part of the pixel values provided by circuit 105. Sub-circuit 120 further comprises a microcontroller 124 (MCU), an interface or bus 125 (I2C) capable of receiving or transmitting control, clock, and/or data signals from or to external circuits, a programmable circuit 126 for providing internal clock signals (PLL), a register bank or memory area 127 (BANK) where various parameters may be recorded and to which unit 123 may access, a circuit 128 (IMG TIMING) capable of providing sensor pixel selection and control signals to selection circuit 103, and a circuit 129 for powering (REGUL) the various elements of circuit 120.

Sub-circuit 160 comprises an ambient luminosity level calculation unit 161 (ALS) receiving pixel data provided by read circuit 105 in digital form, and capable of providing a luminosity measurement based on the received pixel data. In this example, circuit 160 comprises an internal clock 162 designed to control the frequency at which luminosity measurements are performed in the second operating mode (for example, every 100 ms). Circuit 160 further comprises a second internal clock 163, of higher frequency than clock 162, for example, a frequency on the order of 50 MHz, capable of rating the sequences of control of the pixels of sensor 101. In this example, circuit 160 comprises an interface or bus 164 (I2C) capable of receiving or transmitting clock control and/or data signals from or to external circuits, a register bank or memory area 165 (BANK) where various parameters may be recorded and to which unit 161 has access, a circuit 166 (ALS TIMING) capable of providing sensor pixel control and selection signals to selection circuit 103, and a circuit 167 for powering (REGUL) the various elements of circuit 160.

In this example, sub-circuit 120 may access memory area 165 of sub-circuit 160, which enables the two sub-circuits 120 and 160 to exchange setting, configuration, and the like parameters.

Further, in this example, the circuit for controlling sensor 101 comprises a multiplexer 107 between the outputs of circuits 128 and 166 and the input of circuit 103.

When sensor 101 is used to provide images (first operating mode), it may be provided to deactivate control sub-circuit 160. The sensor is then controlled by control sub-circuit 120 which provides both images and an ambient luminosity level. When the sensor is not used to provide images (second operating mode), it may be provided to deactivate control sub-circuit 120. The sensor is then controlled by control sub-circuit 160 which then periodically provides an ambient luminosity level. In the second operating mode, the power supply of control sub-circuit 120 may be interrupted.

Specific embodiments have been described. Various alterations, modifications, and improvements will occur to those skilled in the art. In particular, it will be within the abilities of those skilled in the art to implement the provided method for measuring the ambient luminosity level by means of photodiodes of an image sensor, using other sensor control circuits than that described in relation with FIG. 1.

Further, the described embodiments are not limited to the case where the ambient luminosity level is used to control the intensity of an illuminated display screen. Other uses of the ambient luminosity measurement may be provided.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit, comprising:
    an image sensor including a plurality of pixels;
    a line selection circuit configured to make line selections of pixels in the image sensor in response to a line selection control signal;
    an image control circuit configured to output an image control signal;
    an ambient control circuit configured to output an ambient control signal; and
    a multiplexer having a first input for receiving the image control signal and a second input for receiving the ambient control signal, said multiplexer operable to select one of said image control signal and ambient control signal for application as the line selection control signal to said line selection circuit.

2. The circuit of claim 1, wherein said multiplexer selects the image control signal when said circuit is operable in an imaging mode, said image control circuit further configured to process pixel information output from the image sensor and output an image.

3. The circuit of claim 1, wherein said multiplexer selects the ambient control signal when said circuit is operable in an ambient mode, said ambient control circuit further configured to process pixel information output from the image sensor and output an ambient luminosity value.

4. The circuit of claim 3, wherein said selected ambient control signal as the line selection control signal causes the line selection circuit to select a subassembly of pixels of the image sensor, and wherein processed pixel information comprises read output values of the selected pixels in said subassembly, the ambient luminosity value calculated from said read output values.

5. The circuit of claim 4, wherein the image sensor comprises pixels screened by an opaque mask, and wherein the pixels in said selected subassembly comprise said screened pixels.

* * * * *